US012627084B2

(12) United States Patent
Caviness

(10) Patent No.: US 12,627,084 B2
(45) Date of Patent: May 12, 2026

(54) COAXIAL CONNECTOR WITH GROUNDING AND RETENTION

(71) Applicant: PPC BROADBAND, INC., East Syracuse, NY (US)

(72) Inventor: Jordan Caviness, Liverpool, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 430 days.

(21) Appl. No.: 18/105,471

(22) Filed: Feb. 3, 2023

(65) Prior Publication Data

US 2023/0246350 A1 Aug. 3, 2023

Related U.S. Application Data

(60) Provisional application No. 63/306,166, filed on Feb. 3, 2022.

(51) Int. Cl.
*H01R 9/05* (2006.01)
*H01R 24/40* (2011.01)

(52) U.S. Cl.
CPC ........... *H01R 9/0527* (2013.01); *H01R 24/40* (2013.01)

(58) Field of Classification Search
CPC .... H01R 9/0527; H01R 24/40; H01R 13/622; H01R 9/0521
USPC ........................................................ 439/578
See application file for complete search history.

(56) References Cited

U.S. PATENT DOCUMENTS

2008/0311790 A1* 12/2008 Malloy ................ H01R 13/622 439/583
2010/0297875 A1 11/2010 Purdy et al.
2012/0040537 A1 2/2012 Burris
2013/0237089 A1 9/2013 Lu
2015/0024627 A1 1/2015 Wei
2020/0106225 A1* 4/2020 Watkins ............... H01R 9/0527
2020/0235533 A1* 7/2020 Oakes .................... H01R 13/15

FOREIGN PATENT DOCUMENTS

CN 105940572 B 1/2019

OTHER PUBLICATIONS

International Search Report and Written Opinion dated May 23, 2023 in corresponding International Application No. PCT/US2023/012291, 14 pages.

* cited by examiner

*Primary Examiner* — Christopher M Koehler
*Assistant Examiner* — Gregory L Mangot
(74) *Attorney, Agent, or Firm* — MH2 TECHNOLOGY LAW GROUP LLP

(57) ABSTRACT

A cable connector including: a body; a nose having a forward nose portion, a rearward nose portion that is configured to be coupled with the body, and a recessed nose portion; a coupler configured to be coupled with the forward nose portion; a conductor configured to be supported in the body and the nose portion; and a biasing portion configured to be received in the recessed nose portion. The coupler is configured to be rotatably coupled to the nose; and the biasing portion is configured to biasingly provide an electrical ground path between the nose and the coupler so as to improve an electrically conductive connection between an outer conductor of a coaxial cable and the coupler when the coupler is not connected to an interface port, when the coupler is loosely coupled to the interface port, and when the coupler is fully tightened to the interface port.

26 Claims, 7 Drawing Sheets

COAXIAL CONNECTOR WITH GROUNDING AND RETENTION

CROSS-REFERENCE TO RELATED APPLICATION

This application claims the benefit of U.S. Provisional Application No. 63/306,166 filed Feb. 3, 2022, the disclosure of which is hereby incorporated by reference herein in its entirety.

BACKGROUND

The present invention relates generally to connectors for terminating coaxial cable. More particularly, the present invention relates to axially compressible connectors for coaxial cables that provides a secure ground connection and retains a coupler to a post.

Coaxial cables are commonly used in the cable television industry to carry cable TV signals to television sets in homes, businesses, and other locations.

Exemplary flexible coaxial cables include a solid wire core or inner conductor, typically of copper or copper-clad aluminum, surrounded by a flexible tubular outer conductor. The outer conductor is also usually made of woven copper or aluminum. Dielectric material or insulation separates the inner and outer conductors. The outer conductor is covered with a cable jacket or sheath of plastic to provide protection against corrosion and weathering.

The ability of a connector to make a solid ground connection to the outer conductor of a device is required to achieve long term performance as well as facilitate proper signal transmission through the connector with minimal loss or disruption of the signal. It may be desirable to provide a connector that provides a secure contact between outer conductors in drop connectors and in coaxial connections to devices such as cable TV boxes, modems, and the like.

Threaded swivel cable connectors have been employed to provide a way to connect a cable to an interface port or other device without introducing a twist into the cable. These and other connectors can provide an electrically conductive connection between the outer conductor of the coaxial cable and a coupler of the connector. However, this electrically conductive connection can be compromised by a poor contact between a housing of the coupler and other parts of the connector.

It may be desirable to provide a connector that overcomes one or more of the aforementioned disadvantages of connectors. That is, it may be desirable to provide a connector having a wave shaped biasing portion that is configured to provide an electrical ground path between the nose portion and the coupler so as to improve an electrically conductive connection between an outer conductor of a coaxial cable and the coupler when the coupler is not connected to an interface port, when the coupler is loosely coupled to the interface port, and when the coupler is fully tightened to the interface port.

SUMMARY

In embodiments, a wave shaped biasing portion is configured to provide an electrical ground path between a nose portion and a coupler so as to improve an electrically conductive connection between an outer conductor of a coaxial cable and the coupler when the coupler is not connected to an interface port, when the coupler is loosely coupled to the interface port, and when the coupler is fully tightened to the interface port.

Embodiments of the disclosure include a coaxial cable connector including: a connector body having a rearward cable receiving end and a forward end opposite the rearward cable receiving end; a nose portion having a rearward end and a forward end, wherein the rearward end is configured to be coupled with the forward end of the connector body; a coupler configured to be coupled with the forward end of the nose portion; a post disposed within at least a portion of the connector body and the nose portion; and a wave shaped biasing portion configured to be received by at least a portion of a receiving groove in an outer surface at the forward end of the nose portion.

In embodiments, the coupler is configured to be rotatably coupled to the nose portion.

In embodiments, the coupler has an inward radial protrusion configured to extend radially inwardly, and the inward radial protrusion has a forward radial wall and a rearward radial wall.

In embodiments, the wave shaped biasing portion has a front radial side and a rear radial side and is configured to form less than a complete circle.

In embodiments, the wave shaped biasing portion is configured to have an undulating shape when not axially compressed such that the front and rear radial sides of the first wave spring are not planar surfaces.

In embodiments, the front and rear radial sides of the wave shaped biasing portion are parallel.

In embodiments, the wave shaped biasing portion is configured to have an inner diameter that is less than an outer diameter of the receiving groove when the wave shaped biasing portion is not mounted in the receiving groove.

In embodiments, wherein the wave shaped biasing portion is configured to provide an electrical ground path between the nose portion and the coupler so as to improve an electrically conductive connection between an outer conductor of a coaxial cable and the coupler when the coupler is not connected to an interface port, when the coupler is loosely coupled to the interface port, and when the coupler is fully tightened to the interface port.

In embodiments, the wave shaped biasing portion comprises a wave spring and further comprising a second wave shaped biasing portion that is configured to be received in the receiving groove.

In embodiments, the second wave shaped biasing portion includes a front radial side and a rear radial side and is configured to form less than a complete circle.

In embodiments, the second wave shaped biasing portion is configured to have an undulating shape when at rest such that the front and real radial sides of the second wave shaped biasing portion are not planar surfaces.

In embodiments, the front and rear radial sides of the second wave shaped biasing portion are parallel.

In embodiments, the second wave shaped biasing portion is configured to have an inner diameter that is less than the outer diameter of the receiving groove when the second wave spring is not mounted in the receiving groove.

In embodiments, the second wave shaped biasing portion is configured such that a portion of the rear radial side of the second wave shaped biasing portion contacts the forward radial wall of the inward radial protrusion while simultaneously a portion of the front radial side of the second wave shaped biasing portion contacts a forward radial wall of the receiving groove so as to retain the coupler on the connector body.

In embodiments, the second wave shaped biasing portion is configured to provide an electrical ground path between the nose portion and the coupler so as to improve an electrically conductive connection between an outer conductor of a coaxial cable and the coupler when the coupler is not connected to an interface port, when the coupler is loosely coupled to the interface port, and when the coupler is fully tightened to the interface port.

Embodiments of the disclosure include a coaxial cable connector including: a body portion having a rearward cable receiving body portion and a forward body portion opposite the rearward cable receiving body portion; a nose portion having a rearward nose portion configured to be coupled with the forward body portion and a forward nose portion that includes an outer nose surface that is configured to form a recessed nose portion; a coupler portion configured to be coupled with the forward nose portion; a conductor portion that is configured to be supported in at least a portion the connector body portion and the nose portion; and a biasing portion configured to be received in the recessed nose portion.

In embodiments, the coupler portion is configured to be rotatably coupled to the nose portion.

In embodiments, the coupler portion includes an inward radially protruding coupler portion that is configured to protrude radially inwardly.

In embodiments, the biasing portion is configured to have an undulating shape when not axially compressed.

In embodiments, the biasing portion includes a front biasing portion that is configured to contact the protrusion portion during operation of the connector and a rear biasing portion that is configured to contact the recess during operation of the connector.

In embodiments, the biasing portion is configured to provide an electrical ground path between the nose portion and the coupler portion so as to improve an electrically conductive connection between an outer conductor of a coaxial cable and the coupler portion when the coupler portion is not connected to an interface port, when the coupler portion is loosely coupled to the interface port, and when the coupler portion is fully tightened to the interface port.

In embodiments, the biasing portion comprises a wave spring and is configured to have an inner diameter that is configured to be less than an outer diameter of the recessed nose portion when the biasing portion is not mounted in the recessed nose portion.

In embodiments, the front biasing portion and the rear biasing portion are configured to extent parallel to each other during operation of the biasing portion.

In embodiments, the protrusion portion includes a rearward radial wall protrusion portion and the front biasing portion is configured to contact the rearward radial wall protrusion portion so as to retain the coupler portion on the body portion during operation of the connector.

In embodiments, the biasing portion includes a front radial biasing side portion and a rear radial biasing side portion, and wherein the biasing portion is configured to form less than a complete circle.

In embodiments, the front radial biasing side portion and the rear radial biasing side portion of the biasing portion comprise non-planar surfaces.

In embodiments, the recessed nose portion comprises a groove.

In embodiments, the conductor portion comprises a post.

In embodiments, the biasing portion comprises a wave spring.

In embodiments, the biasing portion comprises a first biasing portion and further comprising a second biasing portion configured to be received in the recessed nose portion.

In embodiments, the second biasing portion includes a second front biasing portion and a second rear biasing portion, and the second biasing portion is configured to form an undulating shape when not axially compressed, and wherein the second rear biasing portion is configured to contact the protrusion portion while the second front biasing portion contacts the recessed nose portion so as to retain the coupler portion on the body portion.

In embodiments, the second biasing portion is configured to biasingly provide an electrical ground path between the nose portion and the coupler portion so as to improve an electrically conductive connection between an outer conductor of a coaxial cable and the coupler portion when the coupler portion is not connected to the interface port, when the coupler portion is loosely coupled to the interface port, and when the coupler portion is fully tightened to the interface port.

In embodiments, the second biasing portion comprises a wave spring.

In embodiments, the front biasing portion is configured to contact the protrusion portion during operation of the connector and the rear biasing portion is configured to simultaneously contact the recess during operation of the connector.

Embodiments of the disclosure include a cable connector including: a body portion having a forward body portion; a nose portion having a forward nose portion, a rearward nose portion that is configured to be coupled with the forward body portion, and a recessed nose portion; a coupler portion configured to be coupled with the forward nose portion; a conductor portion configured to be supported in at least part of the body portion and the nose portion; and a biasing portion configured to be received in at least a part of the recessed nose portion.

In embodiments, the coupler portion is configured to be rotatably coupled to the nose portion.

In embodiments, the biasing portion is configured to biasingly provide an electrical ground path between the nose portion and the coupler portion so as to improve an electrically conductive connection between an outer conductor of a coaxial cable and the coupler portion when the coupler portion is not connected to an interface port, when the coupler portion is loosely coupled to the interface port, and when the coupler portion is fully tightened to the interface port.

In embodiments, the coupler portion includes a protruding coupler portion that is configured to protrude in a radially inwardly direction.

In embodiments, the conductor portion comprises a recessed conductor portion.

In embodiments, the biasing portion includes a front biasing portion and a rear biasing portion, and the biasing portion is configured such that the front biasing portion is configured to contact the protruding coupler portion while the rear biasing portion is configured to contact the recessed nose portion so as to retain the coupler portion on the body portion.

In embodiments, the biasing portion is configured to have an undulating shape when not axially compressed.

In embodiments, the biasing portion comprises a first biasing portion and further comprising a second biasing portion that configured to be received in the recessed nose portion.

In embodiments, the second biasing portion is configured to have an undulating shape when not axially compressed.

In embodiments, the second biasing portion is configured to biasingly provide an electrical ground path between the nose portion and the coupler portion so as to improve an electrically conductive connection between the outer conductor of the coaxial cable and the coupler portion when the coupler portion is not connected to the interface port, when the coupler portion is loosely coupled to the interface port, and when the coupler portion is fully tightened to the interface port.

In embodiments, the second biasing portion comprises a wave spring.

In embodiments, the forward nose portion comprises the recessed nose portion.

Various aspects of the coaxial connector, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

In embodiments, a wave shaped biasing portion is configured to provide an electrical ground path between a nose portion and a coupler so as to improve an electrically conductive connection between an outer conductor of a coaxial cable and the coupler when the coupler is not connected to an interface port, when the coupler is loosely coupled to the interface port, and when the coupler is fully tightened to the interface port.

Figure 1:
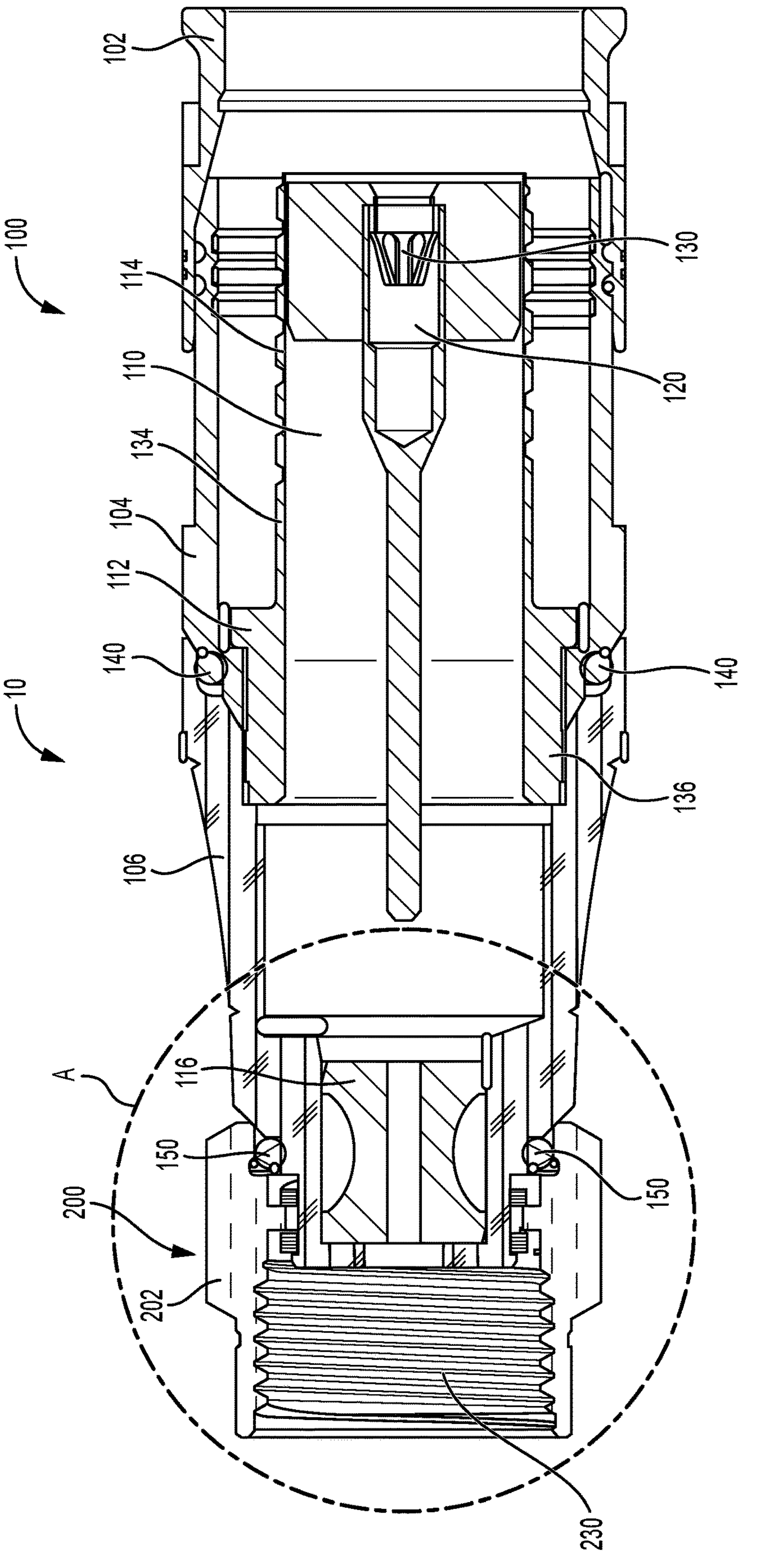
FIG. 1 is a side cross-sectional view of an exemplary coaxial connector in accordance with various aspects of the disclosure.
Figure 2:
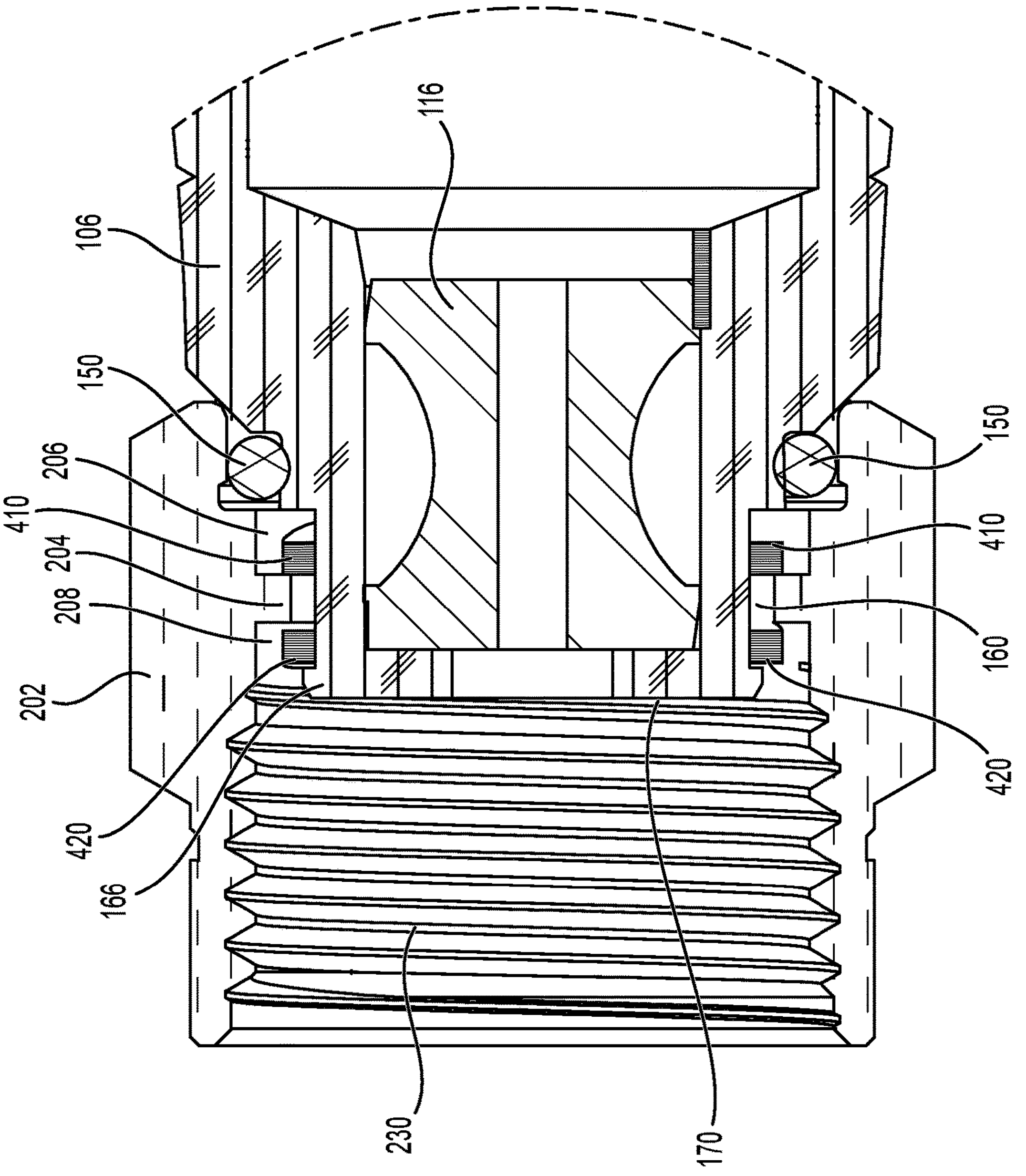
FIG. 2 is a magnified partial view of FIG. 1 in area A.

FIG. 1 shows a perspective view of an exemplary connector assembly 10 in accordance with various aspects of the disclosure is illustrated. FIG. 2 shows a magnified view of the portion of FIG. 1 marked as "A". The connector 10 includes a body or body portion 100 and a coupler or coupler portion 200 that are configured to be connected to one another while providing both an electrical and mechanical connection therebetween. In an assembled position, as shown in FIG. 1, the coupler 200 has internal threads 230 configured to be threaded onto an interface port 300 (shown in FIGS. 3 and 4) to couple the connector assembly 10 with the interface port 300 such that an electrical and mechanical connection is securely maintained.

FIG. 1 shows an example of various features of the connector assembly 10. As shown in FIG. 1, a compression portion 102, for example, a compression sleeve or ring, at a rearward end of the connector 100 has an opening configured to receive a coaxial cable. The coaxial cable generally includes a solid center conductor typically formed from a conductive metal, such as copper, copper clad aluminum, copper clad steel, or the like capable of conducting electrical signals therethrough. Surrounding the cable center conductor is a cable dielectric, which insulates the cable center conductor to minimize signal loss. The cable dielectric also maintains a spacing between the cable center conductor and a cable outer conductor or shield. The cable dielectric is often a plastic material, such as a polyethylene, a fluorinated plastic material, such as a polyethylene or a polytetrafluoroethylene, a fiberglass braid, or the like. The cable shield or outer conductor is typically flexible and made of metal, such as aluminum or copper braid. An insulative cable jacket may surround the cable outer conductor to further seal the coaxial cable. The cable jacket is typically made of plastic, such as polyvinylchloride, polyethylene, polyurethane, or polytetrafluoroethylene.

The connector 100 includes a plurality of components generally having a coaxial configuration about an axis defined by the center conductor of the coaxial cable. A nose portion 106 receives a post 112 in an axial bore from a rearward direction which is opposite to the coupler 200. The nose portion 106 is an electrically conductive material such as aluminum, brass, or the like. The post 112 is an electrically conductive material such as aluminum, brass, or the like and has a cylindrical portion 134 that extends in the rearward direction and includes an axial bore 110. The post 112 has a flange 136 that is configured to engage the inner wall of the nose portion 106. The flange 136 provides additional surface area of electrical contact with the nose portion 106. The cylindrical portion 134 extends rearward from the flange 136. In embodiments, an outer body portion 104 is axially and radially fixed to the post 112. In embodiments, the outer body portion 104 is snap fit over a head of the post 112 and then the post 112 is press fit to the nose portion 106. The cylindrical portion 134 has an engagement feature 114 along a portion of its length. When the coaxial cable is inserted into connector 100, the cylindrical portion 134 penetrates the coaxial cable between the cable dielectric and the cable outer conductor or shield and the engagement feature 114 grips the cable outer conductor or shield. In an assembled state, the cylindrical portion 134 forms an electrically conductive connection with the outer conductor or shield.

The outer body 104 extends partially into the nose portion 106 and is limited in movement relative to the nose portion 106 in the axial direction. A knurled or other engaging interface can exist between the outer body 104 and the post 112 to prevent the post 112 from rotating relative to the outer body 104.

The compression ring 102 extends axially partially onto the outer body 104. The connector 100 includes a pin 118 that is received in a dielectric insulator 116 that is located in the nose portion 106. The pin 118 has a center conductor connector 130 (such as a Mill-Max connector) configured to receive and make an electrically conductive connection with the cable center conductor of the coaxial cable. In an assembled state, the cable center conductor extends into a bore 120 of the pin 118.

During connection of the coaxial cable to the connector 100, the coaxial cable is inserted into the opening in the compression ring 102 and into contact with the post 112. The leading edge of the cylindrical portion 134 separates the cable outer conductor or shield from the cable dielectric. As the coaxial cable is further inserted into the connector 100, the cable center conductor enters the center conductor connector 130 and the bore 120. In the assembled state, an electrically conductive path is formed from the cable center conductor through center conductor connector 130 and pin 118. In the assembled state, an electrically conductive path is formed from the cable outer conductor or shield through the post 112 and the nose portion 106.

In the example shown in FIG. 1, an O-ring 140 is located between the outer body 104 and the nose portion 106 to provide additional protection from moisture and other contaminants. FIG. 2 shows a magnified view of the portion of FIG. 1 marked as "A". Referring to FIG. 2, an O-ring 150 is located between the coupler 200 and the nose portion 106 to provide additional protection from moisture and other contaminants. The coupler 200 has a main body 202 that includes an inward radial protrusion 204 that extends from the main body 202 in an inward radial direction. The nose portion 106 has a lip 166 at its forward end that extends radially outward. An inner diameter of the inward radial protrusion 204 is at least as large as an outer diameter of the lip 166 of the nose portion 106 such that the lip 166 is adapted to pass through the inward radial protrusion 204 when the coupler main body 202 is assembled to the nose portion 106. The nose portion 106 has an end surface 170 at its forward end (described in more detail below).

Also shown in FIG. 2 are a first biasing member 410, for example, a first wave spring, and a second biasing member 420, for example, a second wave spring. In the illustrated embodiment, the first wave spring 410 is located in an area 206 in the main body 202, and the second wave spring 420 is located in an area 208 in the main body 202. In this example, an inner diameter of the wave springs 410, 420 is less than an outer diameter of a cylindrical portion 160 of the nose portion 106. In an exemplary assembly process, the first wave spring 410 is pressed over the lip 166 on onto the cylindrical portion 160. The forwards end of the nose portion (with the first wave spring 410) is then pushed through the opening surrounded by the inward radial protrusion 204. The second wave spring 402 is then pressed over the lip 166 onto the cylindrical portion 160 such that the inward radial protrusion 204 is located between the first wave spring 410 and the second wave spring 420, as shown in FIG. 2. This configuration results in the coupler 200 being mechanically and electrically connected to the nose portion 106.

Figure 3:
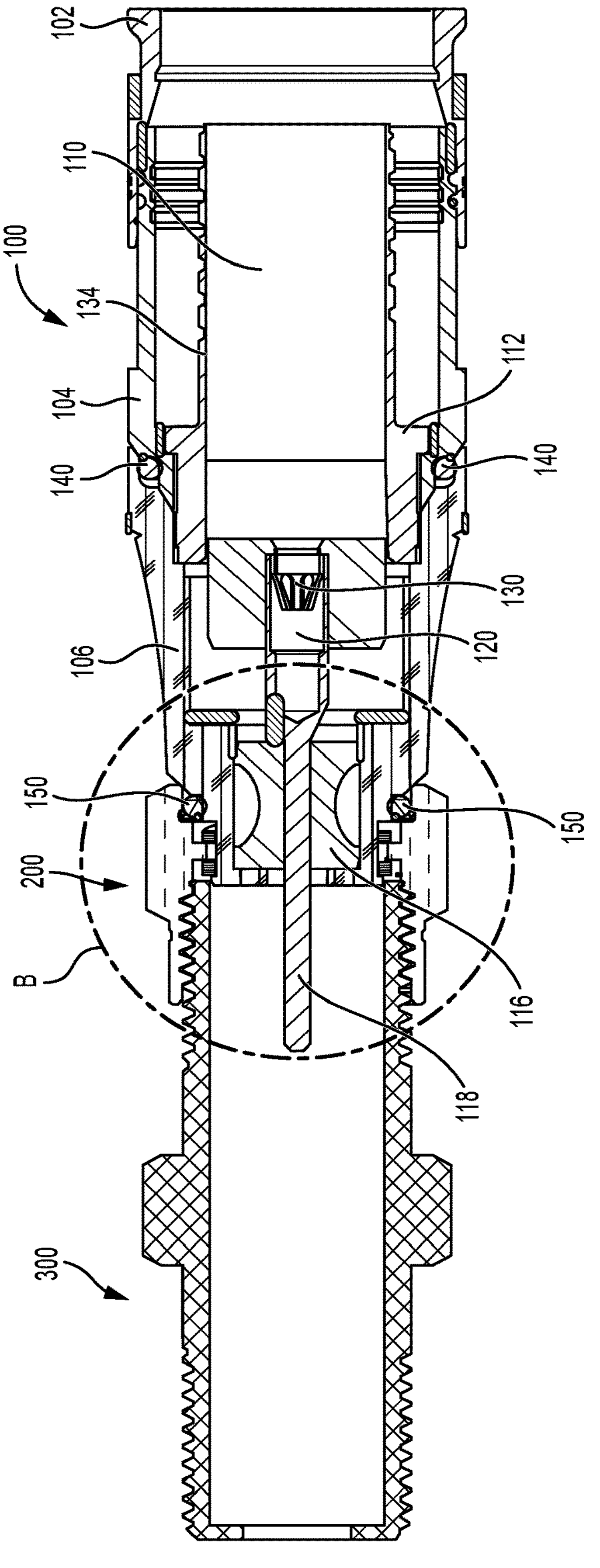
FIG. 3 is a side cross-sectional view of the connector of FIG. 1 in a compressed state in which the connector is attached to an interface port.
Figure 4:
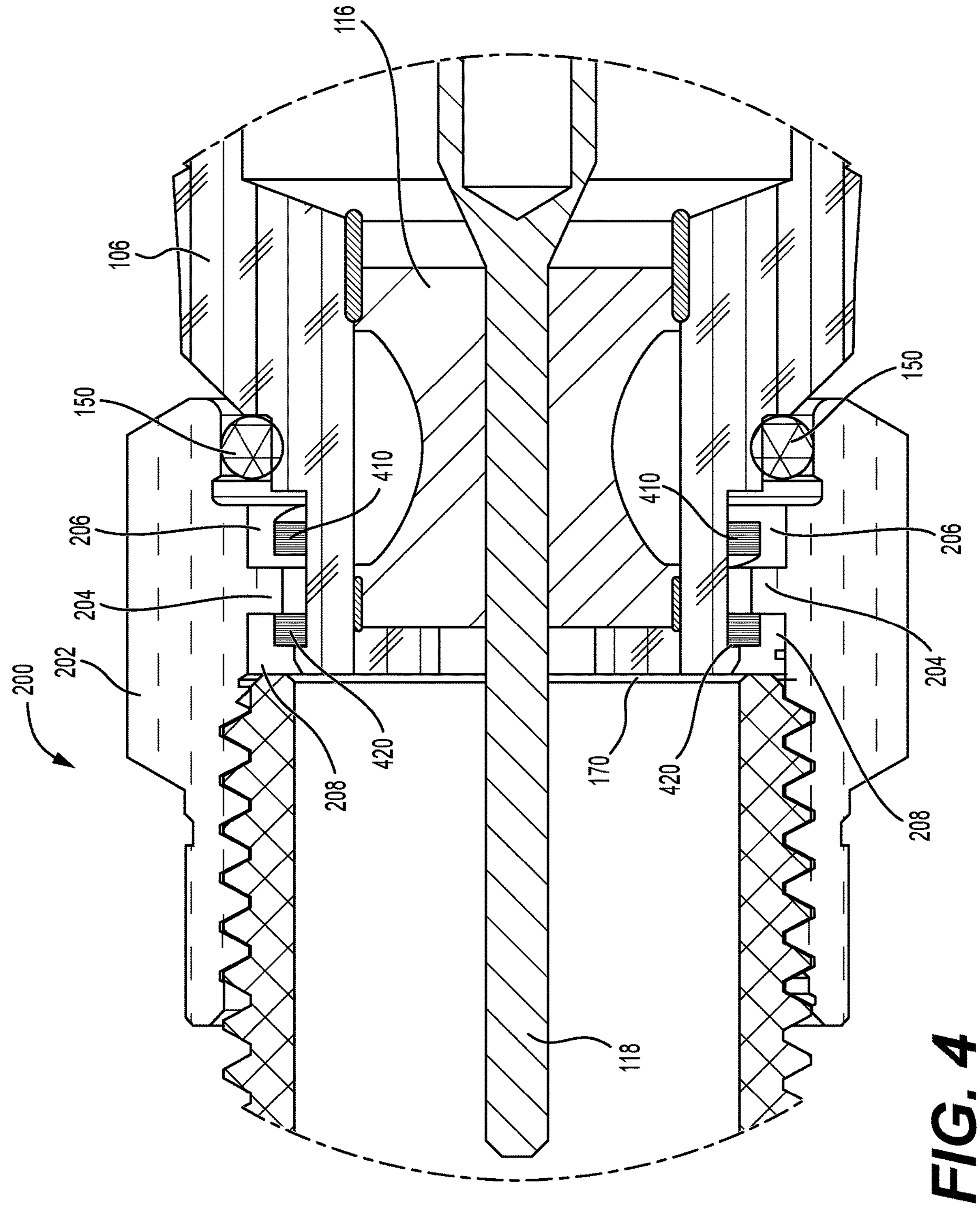
FIG. 4 is a magnified partial view of FIG. 3 in area B.

FIG. 3 shows a perspective view of the connector assembly 10 in an assembled state with the interface port 300. FIG. 4 shows a magnified view of the portion of FIG. 3 marked as "B". The connector assembly 10 and the interface port 300 are configured to be removably connected to one another while providing both an electrical and mechanical connection therebetween. In an assembled position, as shown in FIG. 3, the coupler 200 of the connector 100 is threaded onto the interface port 300 to hold the connector 100 and the interface port 300 together such that the electrical and mechanical connection is securely maintained. A "loosely coupled" state is understood to mean that the coupler 200 is partially coupled to the interface port 300, but not completely tightened to the interface port 300. A "fully tightened" state is understood to mean that the coupler 200 is completely tightened to the interface port 300 such as, for example, a threaded connection between the coupler 200 and the interface port 300 being tightened until an end of the interface port 300 contacts the end 170 of the nose portion 106 and the second wave spring 420 is compressed to a state where the radial sides of the second wave spring are planar.

While FIGS. 1 and 2 show the coupler 200 in an uncompressed state, FIGS. 3 and 4 show the coupler 200 in a compressed state. A careful comparison of FIGS. 2 and 4 shows that in FIG. 4 the second wave spring 420 is compressed between a radial surface 168 of the lip 166 (see FIG. 7) and the inward radial protrusion 204, while in FIG. 2 space exists between the second wave spring 420 and the inward radial protrusion 204. The compressed state shown in FIGS. 3 and 4 is caused by the end 170 of the nose portion 106 being pushed to the right in the Figures by the interface port 300. The undulating shape of the wave springs 410, 420 minimizes the surface contact between radial surfaces (412, 414, 422, 424, shown in FIGS. 5 and 6) of the wave springs and the surfaces they contact. This minimal contact reduces the force required to tighten the coupler 200 to the nose portion 106. While FIGS. 3 and 4 do not show details of the internal structure of the interface port 300, it is noted that one or more internal structures of the interface port 300 press against the end 170 of the nose portion 106 when the coupler main body 202 is threaded onto the interface port 300. This pressure on the end 170 of the nose portion 106 results in the nose portion 106 being moved to the right in FIGS. 3 and 4 relative to the coupler main body 202, thus compressing the second wave spring 420 as shown in FIGS. 3 and 4.

Figure 5:
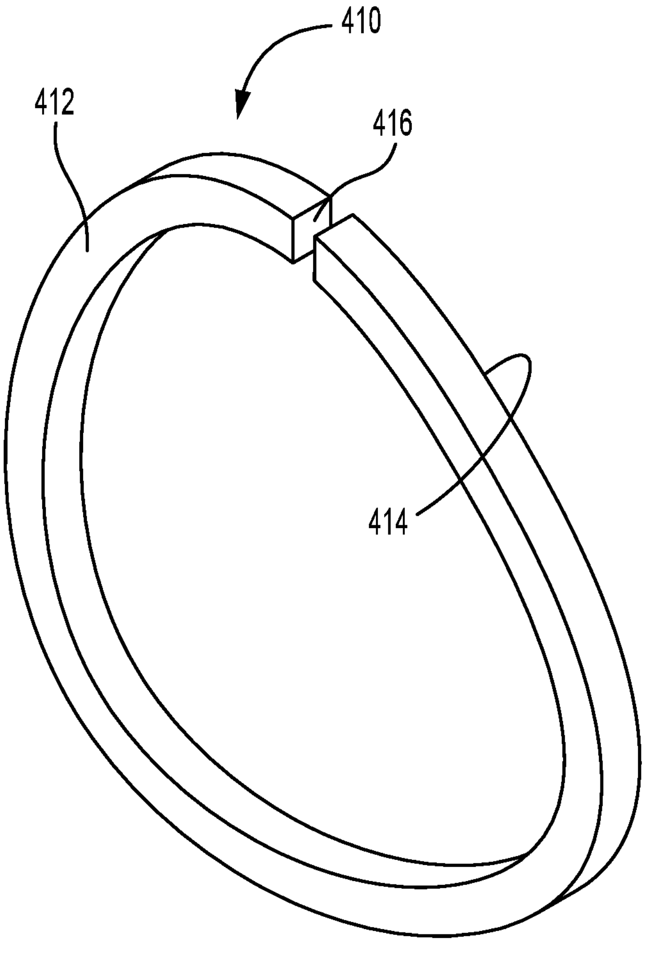
FIG. 5 is a perspective view of a wave spring in accordance with various aspects of the disclosure.
Figure 6:
FIG. 6 is a side view of a wave spring in accordance with various aspects of the disclosure.

FIG. 5 shows an example of the first wave spring 410 having two radial surfaces 412 and 414. In this example, the first wave spring 410 has a gap 416 that allows the first wave spring 410 to be expanded outwardly to, for example, allow the first wave spring 410 to be pressed over the lip 166 of the nose portion 106 during assembly. FIG. 6 shows an example of the second wave spring 420 having two radial surfaces 422 and 424, and a gap 426. In the example shown in FIGS. 1-4, the first wave spring 410 and the second wave spring 420 are identical. In other examples, the first wave spring 410 is a different size and/or shape from the second wave spring 420.

Figure 7:
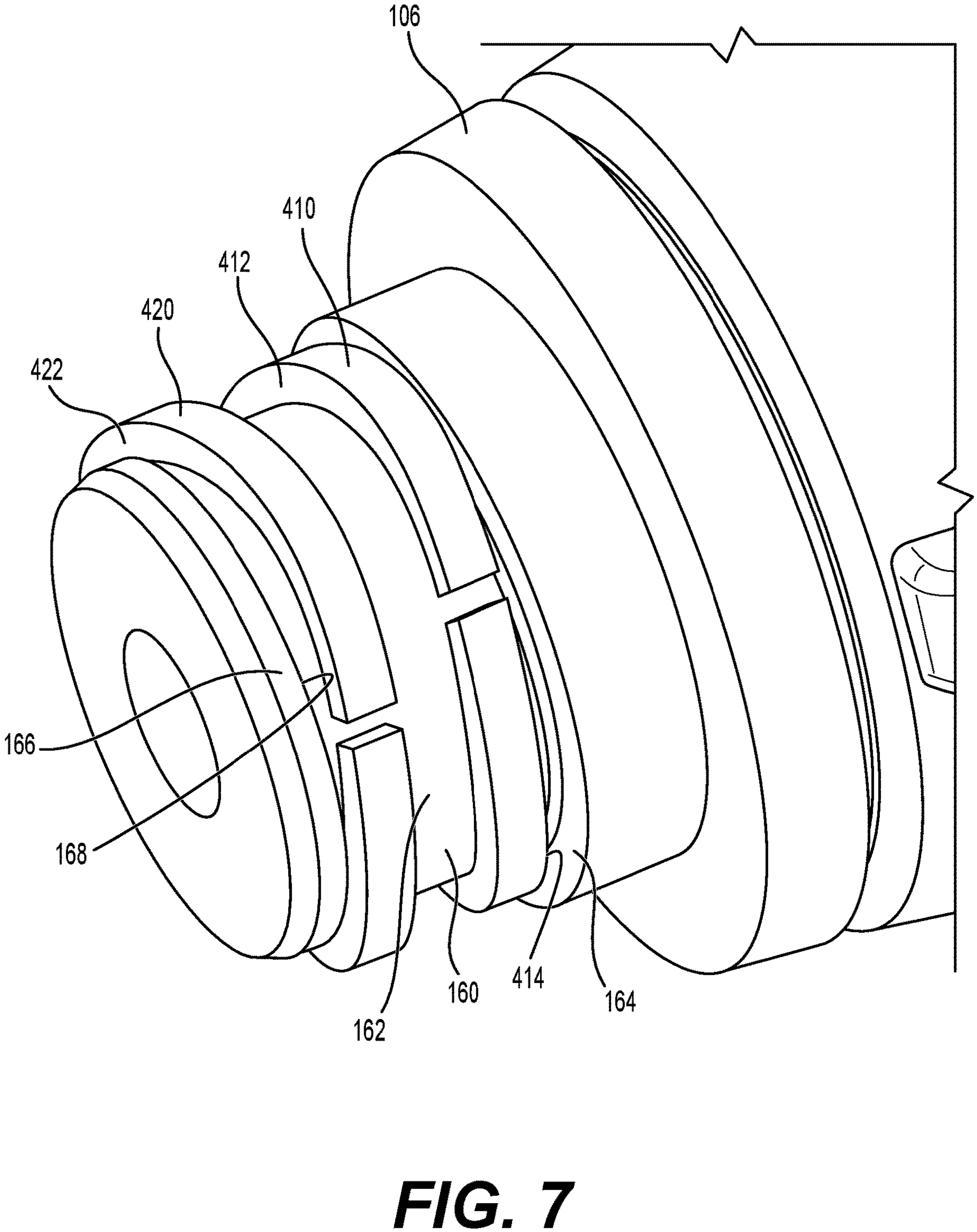
FIG. 7 is a partial perspective view of the connector of FIG. 1 without the coupler and showing two wave springs.

FIG. 7 is a partial perspective view of the forward end of the nose portion 106. FIG. 7 shows the first wave spring 410 and the second wave spring 420 in position on the cylindrical portion 160 of the nose portion 106. In this example, the first wave spring 410 and the second wave spring 420 contact a surface 162 of the cylindrical portion 160 along their entire inner surfaces such that a secure electrically conductive connection is made between both wave springs 410, 420 and the cylindrical portion 160 (and thus the nose portion 106). Also shown in FIG. 7 is a radial surface 164 of the nose portion 106 that forms a wall of the area 206 shown in FIGS. 2 and 4.

Figure 8:
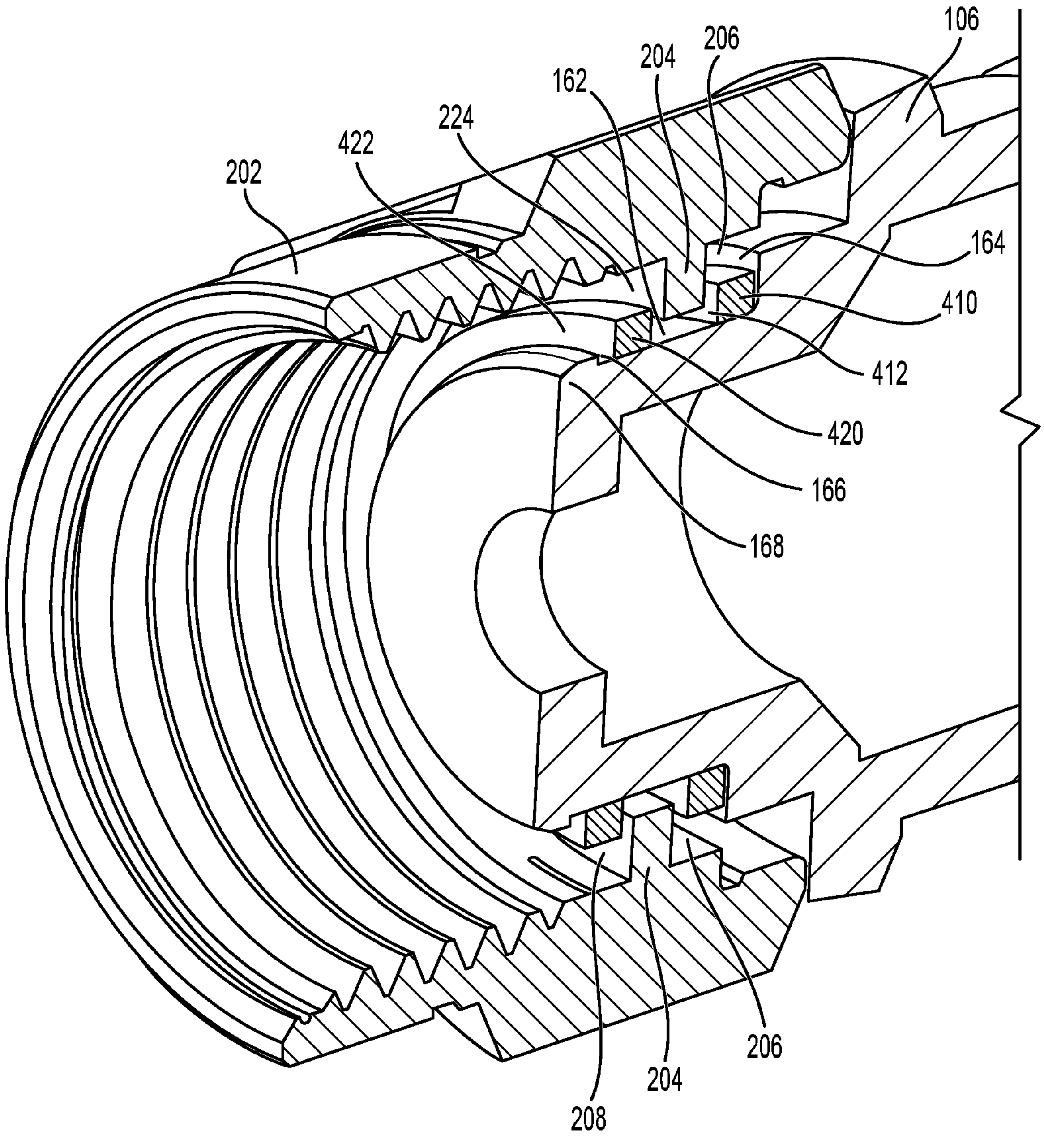
FIG. 8 is a perspective sectional view of the connector of FIG. 1.

FIG. 8 is a partial sectional perspective view of the forward end of the nose portion 106 and the coupler main body 202 in an assembled, uncompressed, state (as shown in FIGS. 1 and 2). FIG. 8 shows the first wave spring 410 and the second wave spring 420 in position on the cylindrical portion 160 of the nose portion 106. As in FIG. 7, the first wave spring 410 and the second wave spring 420 contact the surface 162 of the cylindrical portion 160 along their entire inner surfaces. Also shown in FIG. 8 is the second wave spring 420 not contacting the radial surface 168 of the lip 166. For clarity, O-ring 150 is not shown in FIG. 8.

The described embodiments provide various advantages including a simple and reliable connection that provides a secure conductivity path from the outer conductor of the coaxial cable to the coupler 200. The described embodiments provide this connection while also allowing connection without introducing a twist into the coaxial cable.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A coaxial cable connector comprising:

a connector body having a rearward cable receiving end and a forward end opposite the rearward cable receiving end;

a nose portion having a rearward end and a forward end, wherein the rearward end is configured to be coupled with the forward end of the connector body;

a coupler configured to be coupled with the forward end of the nose portion;

a post disposed within at least a portion of the connector body and the nose portion;

a first wave shaped biasing portion configured to be received by at least a portion of a receiving groove in an outer surface at the forward end of the nose portion;

a second wave shaped biasing portion that is configured to be received in the receiving groove;

wherein the coupler is configured to be rotatably coupled to the nose portion;

wherein the coupler has an inward radial protrusion configured to extend radially inwardly, and the inward radial protrusion has a forward radial wall and a rearward radial wall;

wherein the first wave shaped biasing portion has a front radial side and a rear radial side and is configured to form less than a complete circle;

wherein the first wave shaped biasing portion is configured to have an undulating shape when not axially compressed such that the front and rear radial sides of the first wave shaped biasing portion are not planar surfaces;

wherein the front and rear radial sides of the first wave shaped biasing portion are parallel;

wherein the first wave shaped biasing portion is configured to have an inner diameter that is less than an outer diameter of the receiving groove when the first wave shaped biasing portion is not mounted in the receiving groove;

wherein the first wave shaped biasing portion is configured such that a portion of the front radial side of the first wave shaped biasing portion contacts the rearward radial wall of the inward radial protrusion while simultaneously a portion of the rear radial side of the first wave shaped biasing portion contacts a rearward radial wall of the receiving groove so as to retain the coupler on the connector body; and wherein the first wave shaped biasing portion is configured to provide an electrical ground path between the nose portion and the coupler so as to improve an electrically conductive connection between an outer conductor of a coaxial cable and the coupler when the coupler is not connected to an interface port, when the coupler is loosely coupled to the interface port, and when the coupler is fully tightened to the interface port;

wherein the second wave shaped biasing portion includes a front radial side and a rear radial side and is configured to form less than a complete circle;

wherein the second wave shaped biasing portion is configured to have an undulating shape when at rest such that the front and rear radial sides of the second wave shaped biasing portion are not planar surfaces;

wherein the front and rear radial sides of the second wave shaped biasing portion are parallel;

wherein the second wave shaped biasing portion is configured to have an inner diameter that is less than the outer diameter of the receiving groove when the second wave shaped biasing portion is not mounted in the receiving groove; and wherein the second wave shaped biasing portion is configured such that a portion of the rear radial side of the second wave shaped biasing portion contacts the forward radial wall of the inward radial protrusion while simultaneously a portion of the front radial side of the second wave shaped biasing portion contacts a forward radial wall of the receiving groove so as to retain the coupler on the connector body.

2. The coaxial cable connector of claim 1, wherein the first wave shaped biasing portion comprises a first wave spring, and the second wave shaped biasing portion comprises a second wave spring.

3. The coaxial cable connector of claim 1, wherein the second wave shaped biasing portion is configured to provide an electrical ground path between the nose portion and the coupler so as to improve an electrically conductive connection between an outer conductor of a coaxial cable and the coupler when the coupler is not connected to an interface port, when the coupler is loosely coupled to the interface port, and when the coupler is fully tightened to the interface port.

4. A coaxial cable connector comprising:

a body portion having a rearward cable receiving body portion and a forward body portion opposite the rearward cable receiving body portion;

a nose portion having a rearward nose portion configured to be coupled with the forward body portion and a forward nose portion that includes an outer nose surface that is configured to form a recessed nose portion;

a coupler portion configured to be coupled with the forward nose portion;

a conductor portion that is configured to be supported in at least a portion the connector body portion and the nose portion;

a first biasing portion configured to be received in the recessed nose portion;

a second biasing portion configured to be received in the recessed nose portion;

wherein the coupler portion is configured to be rotatably coupled to the nose portion;

wherein the coupler portion includes an inward radially protruding coupler portion that is configured to protrude radially inwardly;

wherein the first biasing portion is configured to have an undulating shape when not axially compressed;

wherein the first biasing portion includes a first front biasing portion that is configured to contact the protrusion portion during operation of the connector and a first rear biasing portion that is configured to contact the recess during operation of the connector;

wherein the first biasing portion is configured to provide an electrical ground path between the nose portion and the coupler portion so as to improve an electrically conductive connection between an outer conductor of a coaxial cable and the coupler portion when the coupler portion is not connected to an interface port, when the coupler portion is loosely coupled to the interface port, and when the coupler portion is fully tightened to the interface port; and wherein the second biasing portion includes a second front biasing portion and a second rear biasing portion, and the second biasing portion is configured to form an undulating shape when not axially compressed, and wherein the second rear biasing portion is configured to contact the protrusion portion while the second front biasing portion contacts the recessed nose portion so as to retain the coupler portion on the body portion.

5. The coaxial cable connector of claim 4, wherein the first biasing portion comprises a first wave spring and is configured to have an inner diameter that is configured to be less than an outer diameter of the recessed nose portion when the biasing portion is not mounted in the recessed nose portion.

6. The coaxial cable connector of claim 4, wherein the first front biasing portion and the first rear biasing portion are configured to extend parallel to each other during operation of the first biasing portion.

7. The coaxial cable connector of claim 4, wherein the protrusion portion includes a rearward radial wall protrusion portion and the first front biasing portion is configured to contact the rearward radial wall protrusion portion so as to retain the coupler portion on the body portion during operation of the connector.

8. The coaxial cable connector of claim 4, wherein the first biasing portion includes a front radial biasing side portion and a rear radial biasing side portion, and wherein the first biasing portion is configured to form less than a complete circle.

9. The coaxial cable connector of claim 8, wherein the front radial biasing side portion and the rear radial biasing side portion of the biasing portion comprise non-planar surfaces.

10. The coaxial cable connector of claim 4, wherein the recessed nose portion comprises a groove.

11. The coaxial cable connector of claim 4, wherein the conductor portion comprises a post.

12. The coaxial cable connector of claim 4, wherein the first biasing portion comprises a first wave spring.

13. The coaxial cable connector of claim 12, wherein the second biasing portion comprises a wave spring.

14. The coaxial cable connector of claim 4, wherein the second biasing portion is configured to biasingly provide an electrical ground path between the nose portion and the coupler portion so as to improve an electrically conductive connection between an outer conductor of a coaxial cable and the coupler portion when the coupler portion is not connected to the interface port, when the coupler portion is loosely coupled to the interface port, and when the coupler portion is fully tightened to the interface port.

15. The coaxial cable connector of claim 4, wherein the front biasing portion is configured to contact the protrusion portion during operation of the connector and the rear biasing portion is configured to simultaneously contact the recess during operation of the connector.

16. A coaxial cable connector comprising:

a body portion;

a nose portion configured to be coupled with the body portion;

an outer nose surface in the nose portion that is configured to form a recessed nose portion;

a coupler portion configured to be coupled with the nose portion and having an inward radially protruding coupler portion that is configured to protrude radially inwardly;

a first biasing portion configured to be received in the recessed nose portion;

a second biasing portion configured to be received in the recessed nose portion;

wherein the first biasing portion includes a first front biasing portion that is configured to contact the protruding coupler portion during operation of the connector and a first rear biasing portion that is configured to contact the recess during operation of the connector;

wherein the first biasing portion is configured to provide an electrical ground path between the nose portion and the protruding coupler portion so as to improve an electrically conductive connection between an outer conductor of a coaxial cable and the coupler portion when the coupler portion is not connected to an interface port, when the coupler portion is loosely coupled to the interface port, and when the coupler portion is fully tightened to the interface port;

wherein the second biasing portion includes a second front biasing portion and a second rear biasing portion, and the second biasing portion is configured to form an undulating shape when not axially compressed, and wherein the second rear biasing portion is configured to contact the protruding coupler portion while the second front biasing portion contacts the recessed nose portion so as to retain the coupler portion on the body portion;

wherein the second biasing portion includes a front radial side and a rear radial side;

wherein the front and rear radial sides of the second biasing portion are parallel; and wherein the second biasing portion is configured such that a portion of the rear radial side of the second biasing portion contacts the forward radial wall of the protruding coupler portion while simultaneously a portion of the front radial side of the second biasing portion contacts a forward radial wall of the recessed nose portion so as to retain the coupler on the connector body.

17. The coaxial cable connector of claim 16, wherein the first biasing portion is configured to have an undulating shape when not axially compressed.

18. The coaxial cable connector of claim 16, wherein the second biasing portion is configured to form less than a complete circle.

19. The coaxial cable connector of claim 16, wherein the second biasing portion is configured to have an undulating shape when at rest such that the front and rear radial sides of the second biasing portion are not planar surfaces.

20. The coaxial cable connector of claim 16, wherein the second biasing portion is configured to have an inner diameter that is less than the outer diameter of the recessed nose portion when the second biasing portion is not mounted in the recessed nose portion.

21. The coaxial cable connector of claim 16, wherein the cale connector further comprises a conductor portion configured to be supported in at least part of the body portion and the nose portion.

22. The coaxial cable connector of claim 21, wherein the first biasing portion includes a front biasing portion and a rear biasing portion, and the first biasing portion is configured such that the front biasing portion is configured to contact the protruding coupler portion while the rear biasing portion is configured to contact the recessed nose portion so as to retain the coupler portion on the body portion.

23. The coaxial cable connector of claim 16, wherein the first biasing portion is configured to have an undulating shape when not axially compressed.

24. The coaxial cable connector of claim 16, wherein the second biasing portion is configured to biasingly provide an electrical ground path between the nose portion and the coupler portion so as to improve an electrically conductive connection between the outer conductor of the coaxial cable and the coupler portion when the coupler portion is not connected to the interface port, when the coupler portion is loosely coupled to the interface port, and when the coupler portion is fully tightened to the interface port.

25. The coaxial cable connector of claim 16, wherein the first biasing portion comprises a first wave spring.

26. The coaxial cable connector of claim 25, wherein the second biasing portion comprises a second wave spring.

* * * * *